(12) United States Patent
Pelz et al.

(10) Patent No.: US 7,502,794 B2
(45) Date of Patent: Mar. 10, 2009

(54) METHOD FOR CONTROLLING ACCESS TO A RESOURCE OF AN APPLICATION IN A DATA-PROCESSING DEVICE

(75) Inventors: Rodolfo Mann Pelz, Hannover (DE); Thomas May, Wolfenbuettel (DE); Bjoern Hornburg, Holle (DE); Erik Walossek, Halle (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 10/856,059

(22) Filed: May 28, 2004

(65) Prior Publication Data

US 2005/0010528 A1    Jan. 13, 2005

(30) Foreign Application Priority Data

May 28, 2003    (DE)    ................. 103 24 189

(51) Int. Cl.
*G06F 7/00* (2006.01)
(52) U.S. Cl. ............................ 707/9; 707/10
(58) Field of Classification Search ................ 713/176, 713/201, 155; 707/1–10
See application file for complete search history.

(56) References Cited

U.S. PATENT DOCUMENTS

| | | | | |
|---|---|---|---|---|
| 7,260,597 | B1* | 8/2007 | Hofrichter et al. | .......... 709/200 |
| 2002/0087552 | A1* | 7/2002 | Applewhite et al. | ........... 707/10 |
| 2003/0009271 | A1 | 1/2003 | Aliyama | |
| 2003/0028495 | A1* | 2/2003 | Pallante | ........................ 705/78 |
| 2003/0061114 | A1* | 3/2003 | Schwartz et al. | .............. 705/26 |
| 2003/0131244 | A1* | 7/2003 | Buoncristiani et al. | ...... 713/176 |
| 2004/0003084 | A1* | 1/2004 | Malik et al. | .................. 709/225 |
| 2004/0243602 | A1* | 12/2004 | Shiiyama | .................... 707/100 |

FOREIGN PATENT DOCUMENTS

| | | |
|---|---|---|
| DE | 101 41 737 | 4/2003 |
| EP | 0 697 662 | 2/1996 |

OTHER PUBLICATIONS

The Open Services Grateway Initiative, OSGi Service Platform Release, 3-Chapter 1-14, Online! Mar. 31, 2003, IOS Press, The Netherlands. XP002342245.

* cited by examiner

*Primary Examiner*—Wilson Lee
(74) *Attorney, Agent, or Firm*—Kenyon & Kenyon LLP

(57) ABSTRACT

A method for controlling access to a resource of an application in a data-processing device, comprising the steps: registering an access interface of an access-management component at the data-processing device; request by a first application for an access to the access interface of the access-management component at the data-processing device; registering of a resource of the first application at the access-management component actuation of a second application by a user which requests access to the resource of the first application; sending an access-authorization query of the first application about the user to the access-management component; and, given authorization of the user, granting access to the resource of the first application by the second application.

8 Claims, 1 Drawing Sheet

METHOD FOR CONTROLLING ACCESS TO A RESOURCE OF AN APPLICATION IN A DATA-PROCESSING DEVICE

FIELD OF THE INVENTION

The present invention relates to a method for controlling access to a resource of an application in a data-processing device, and particularly a method for the management of persons and their individual access rights in a driver information system of a motor vehicle.

BACKGROUND INFORMATION

Nowadays, the control of access rights in a networked computer structure, e.g. of a business firm, can be accomplished in various familiar ways. In a mobile motor vehicle, however, because of the completely different marginal conditions, there are also completely different structures and therefore demands placed on the control of individual access rights of different persons. Hereinafter, to be understood by the term "driver information system" is a software platform having applications which make information about, for example, traffic, travel routes, messages, communication possibilities such as mobile radio communication or Internet, and entertainment such as radio, CD, MP3, with an integrated control, available in a vehicle. At present, driver information systems contain software components which are operated, for example, in a monolithic system of an individual manufacturer that integrates the software components according to singular methods. The software components are also able to run on different hardware components of several manufacturers, which, for example, are connected to a multimedia bus system. Here as well, however, singular methods are used for the integration of the system, since presently no standard is established for the management of individual access rights of individual persons, particularly in a driver information system.

For a JAVA run-time environment, the industry consortium OSGI (Open Services Gateway Initiative) specifies an applications framework suitable for the integration of components in a software system. Various firms use this OSGI platform as the basis for the development of driver information systems. It supports the management of various software components and the communication between individual components. Moreover, interfaces are specified for predetermined system services. System components which take into account vehicle-specific restrictions and peculiarities, which the access control specifically concerns, are presently unknown, however.

SUMMARY OF THE INVENTION

Compared to the aforesaid attempts, the method of the present invention for controlling access to a resource of an application in a data-processing device has the advantage that a system is able to distinguish between different users, and applications define their own access rights which determine how the users are able to access the application. Thus, a method for access control is provided which, in a component-based application framework or platform, e.g. in a driver information system on the basis of the OSGI specification, permits the management of individual access rights of persons, such as different drivers or roles like, for example, driver or front-seat passenger.

The idea underlying the present invention is essentially to permit individual access rights in a standardized application framework or application platform.

According to a preferred specific embodiment of the present invention, a method is provided for controlling access to a resource of an application in a data processing device, including the steps: registering of an access interface of an access-management component at the data-processing device; request by a first application for an access to the access interface of the access-management component at the data-processing device; registering of a resource of the first application at the access-management component; actuation of a second application by a user which requests access to the resource of the first application; sending an access-authorization query of the first application about the user to the access-management component; and, given authorization of the user, granting access to the resource of the first application by the second application.

According to one preferred refinement, after the resource of the first application has been registered, an administrator defines access rights for the resource of the first application. This has the advantage that, for example, the owner of a vehicle is able to configure the relevant authorizations in the vehicle, which is useful, for instance, for an application such as the offboard navigation for which fees accrue, since possibly only the owner is to utilize this service, and no other driver of the vehicle.

According to another preferred development, one or more predetermined users set up additional users with access rights and/or establish the access rights for other users. The user circle having corresponding access rights may thereby advantageously be expanded or reduced.

According to a further preferred refinement, in addition to the authorization query, a priority query is likewise sent to the access-management component, in order to establish a sequence of a plurality of users according to their access rights and/or priority rights. In this manner, it is possible to ensure a prioritization of specific users.

According to another preferred development, the access-management component registers the access interface as an application in an application framework of an OSGI and/or JAVA-based system. The advantage here is the possibility of using the access control in a standardized application framework such as an OSGI framework.

According to a further preferred refinement, the class or interface of the resource of the first application includes a text that describes the resource, and preferably a definition which contains a standard setting of the access rights. In this manner, it is possible to advantageously provide a simple resource structure of the application.

According to another preferred development, a plurality of resources preferably of a plurality of applications are registered with a single registration. This yields the advantage of a rapid, efficient registration of a plurality of resources of one or more applications.

DETAILED DESCRIPTION

Figure 1:
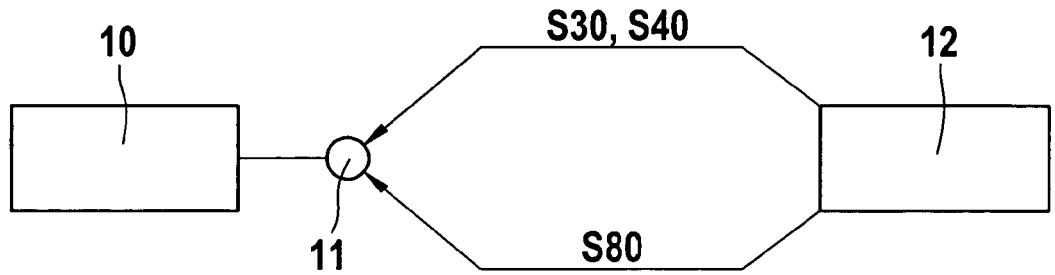
FIG. 1 shows a schematic block diagram for clarification of components according to a specific embodiment of the present invention.

In the figures, the same reference numerals denote the same or functionally equivalent component parts.

Components for clarifying a specific embodiment of the present invention are shown schematically in FIG. 1. An access-management component, hereinafter also known as "permission manager" 10, has an access interface 11, hereinafter also known as "resource registry." Permission manager 10 registers resource registry interface 11 for the defining of access rights in the underlying framework (not shown in FIG. 1). The underlying framework, preferably a JAVA run-time environment, implemented, for example, as an OSGI framework, is operated on a data-processing device (not shown in FIG. 1). A first application 12, e.g. a bundle in an OSGI framework, registers its resources at access interface 11 (S30, S40). For such an application 12, user-specific access rights may be defined that are managed by permission manager 10 in conjunction with access interface 11. According to FIG. 1, application 12 in step S80 queries at permission manager 10 via access interface 11, the authorization of a user. That is to say, if the resources of application 12 are to be accessed, application 12 queries via access interface 11, whether a corresponding access right is given. To that end, an identification of the user must be handed over to application 12, if the intention is to utilize a resource.

Figure 2:
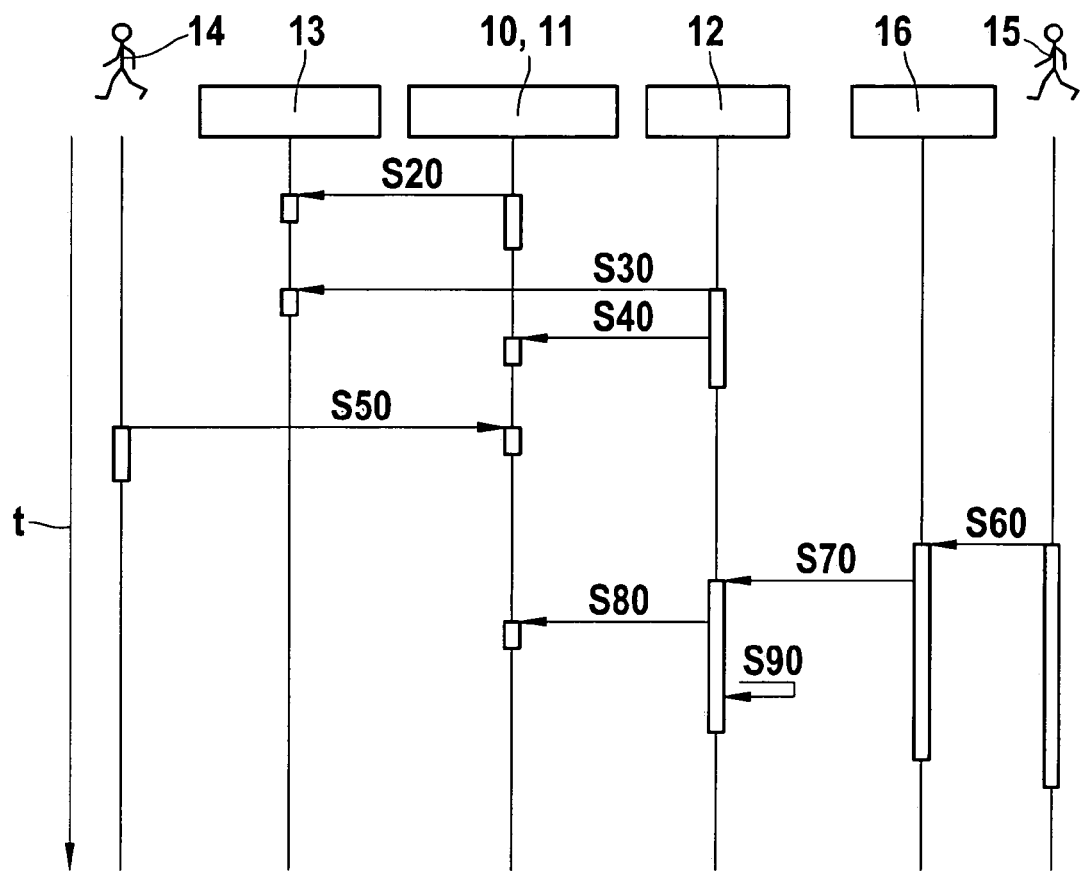
FIG. 2 shows a schematic flowchart for clarifying the functioning of an access-control method according to a specific embodiment of the present invention.

A flowchart for clarifying a specific embodiment of the present invention in greater detail is shown schematically in FIG. 2. The time characteristic is designated by t. According to FIG. 2, in step S20, permission manager 10, i.e. the permission manager, registers access interface 11 resource registry in an underlying framework 13 that runs on a data-processing device. A first application 12, e.g. a bundle, in step S30 thereupon requests access to access interface 11 resource registry in framework 13. In step S40, a resource of first application 12 is then registered at permission manager 10 via access interface 11. These steps S20 through S40 proceed independently of a user-access query. In step S50, an administrator 14 defines access rights for individual users of one or more resources of application 12.

If at this point, a user 15 begins a second application in step S60, second application 16 attempts in step S70 to access one or more resources in first application 12. Thereupon, according to step S80, application 12 inquires at permission manager 10 via access interface 11 about the authorization of the user, which was defined in step S50 by administrator 14. Given valid authorization, first application 12 thereupon grants access to one or more resources of first application 12 by user 15 to second application 16. In this context, it is unavoidable that steps S60 through S90 follow steps S20 though S40 and possibly S50, since otherwise really no interface for the query or even access rights for corresponding resources of an application are defined yet in the framework on the data-processing device.

Permission manager component 10 enables components, for the run time, to define their own access rights which are centrally managed by permission manager 10 in the system, i.e. in framework 13. The access rights may be set for each user 15 by authorized users 14 or administrators via permission manager 10. The access rights allow or forbid access of a specific user 15 to certain functions of application 12. Moreover, priorities for different users 15 may be established for such accesses.

In a JAVA-based, particularly OSGI-based system, permission manager 10 registers an interface ResourceAccess as a service in OSGI framework 13. A preferred implementation reads, for example

```
public interface ResourceAccess
{
public void register Resource (Resource r);
public boolean has access (Resource r, User u);
public boolean has priority (Resource r, User u1, User u2);
}
```

In this context, an application 12 uses the method register resource ( ), in order to register a resource at permission manager 10. Permission manager 10 thereupon permits authorized users, that is, for example, administrator 14, to define access rights and priorities of all users 15 with respect to these resources. The class or interface resource contains, for instance, a text which describes the resource and has a standard setting for the access rights. Alternatively, a plurality of resources may also be registered using a single method call.

The method "hasAccess" is used to re-check whether a user, i.e. user 15, which is described by handed-over user object of application 16, is allowed to access the resource that is defined by handed-over resource object of application 12. Alternatively, simplified identifiers for a resource of an application 12 and/or a user 15 may be handed over as arguments. With the method "hasPriority", an application 12, 16 is able to check whether user 15 defined by u1 has priority over the user (not shown) indicated by u2 with respect to a resource. In addition, permission manager 10 allows authorized users 14, e.g. the owner of the system, to set up new users 15 and to establish the access rights for other users 15 (S50).

Although the present invention was described above in light of a preferred exemplary embodiment, it is not restricted to it, but is able to be modified in diverse ways. Thus, the method for access control is also transferable to other standardized frameworks, e.g. with supplementation of the specifications of HAVi, DAB-JAVA, MHP, Microsoft.net or an operating system on a data processing device. In addition, use is also possible in systems other than the described driver information system in a vehicle. Morever, indicated applications 12, 16 may also be offered later, e.g. via a central server, or for installation by a data carrier, such as a CD-ROM, in the framework on the data processing device.

What is claimed is:

1. A method for controlling access to a resource of an application in a data-processing device, comprising the steps:
   registering an access interface of an access-management component at the data-processing device;
   requesting access to the access interface of the access-management component at the data-processing device by a first software program;
   registering a resource of the first software program at the access-management component;
   actuating a second software program by a user who requests access to the resource of the first software program;
   sending an access-authorization query of the first software program about the user to the access-management component; and
   given authorization of the user, granting access to the resource of the first software program by the second software program.

2. The method as recited in claim 1, further comprising:
   after the resource of the first software program has been registered, defining by an administrator access rights for the resource of the first software program.

3. The method as recited in claim 1, wherein:
at least one predetermined user at least one of sets up additional users with access rights and establishes the access rights for other users.

4. The method as recited in claim 1, further comprising:
addressing a priority query to the access-management component in order to establish a sequence of a plurality of users according to at least one of their access rights and their priority rights.

5. The method as recited in claim 1, wherein:
the access-management component registers the access interface as an application in an application framework of at least one of an OSGI-based system and a JAVA-based system.

6. The method as recited in claim 1, wherein:
a text that describes the resource, as well as a definition of a setting of the access rights are handed over when registering the resource of the first software program.

7. The method as recited in claim 1, wherein:
a plurality of resources including a plurality of applications are registered with a single registration.

8. A method for controlling access to a resource of an application in a data-processing device, comprising the steps:
registering an access interface of an access-management component at the data-processing device;
requesting from the data-processing device access to the access interface of the access-management component by a first software program;
responsive to the first software program receiving grant of access to the access interface, the first software program registering a resource of the first software program at the access-management component;
actuating a second software program by a user, the second software program requesting access to the resource of the first software program;
responsive to the access request of the second software program, sending, by the first software program, an access-authorization query about the user to the access-management component via the access interface; and
given authorization of the user, the first application granting to the second software program access to the resource of the first software program.

* * * * *